United States Patent [19]

Borie

[11] 4,096,058
[45] Jun. 20, 1978

[54] TENSIONING MEANS FOR SIFTER

[76] Inventor: Bernard Francois Borie, 13 rue des Boulangers, Paris, France

[21] Appl. No.: 649,876

[22] Filed: Jan. 16, 1976

[30] Foreign Application Priority Data

Jan. 24, 1975  France ............................. 75 02344

[51] Int. Cl.² .............................................. B07B 1/49
[52] U.S. Cl. .................................. 209/403; 209/408; 209/355; 210/473
[58] Field of Search ............... 209/403, 408, 409, 352, 209/353, 357, 358, 355; 210/473–477, 455, 464, 339, 337

[56] References Cited

U.S. PATENT DOCUMENTS

| 65,406 | 6/1867 | Ludlow | 209/403 |
| 134,455 | 12/1872 | Bingham | 209/403 |
| 153,220 | 11/1874 | Porter | 209/403 |
| 205,210 | 6/1878 | Richardson | 209/403 |
| 565,890 | 8/1896 | Fowler | 210/339 |
| 605,175 | 6/1898 | Buchtel | 209/358 |
| 1,416,145 | 5/1922 | Werner | 209/403 X |
| 1,519,421 | 12/1924 | Stubbs | 210/473 X |
| 1,593,312 | 7/1926 | Shappell | 209/358 X |
| 2,197,435 | 4/1940 | Niemyer | 209/403 |
| 2,511,357 | 6/1950 | Marty | 209/358 X |
| 2,674,375 | 4/1954 | Clay | 209/357 X |
| 3,029,946 | 4/1962 | Wright | 209/405 |
| 3,386,580 | 6/1968 | Grabarczyk | 209/408 X |
| 3,928,189 | 12/1975 | Lower | 209/405 |

FOREIGN PATENT DOCUMENTS

| 511,355 | 5/1952 | Belgium | 209/352 |
| 734,329 | 7/1932 | France | 209/403 |
| 523,343 | 4/1931 | Germany | 209/408 |
| 849,798 | 9/1952 | Germany | 209/357 |
| 327,209 | 3/1919 | Germany | 209/403 |
| 53,771 | 12/1910 | Switzerland | 210/337 |

Primary Examiner—Robert Halper
Attorney, Agent, or Firm—Seidel, Gonda & Goldhammer

[57] ABSTRACT

A sifter comprising an upper part and a lower part which are engaged one into the other, the lower part fixedly carrying the gauze of the sifter, characterized in that the lower part is in one piece, being formed by a central portion having a U-shaped cross-section and receiving the edge of the gauze, said central portion being terminated by two cylindrical or conical portions. The lower end of the upper part, bears against the gauze to hold it in a tensioned condition.

10 Claims, 5 Drawing Figures

TENSIONING MEANS FOR SIFTER

The present invention concerns a sifter and in particular a sifter formed by an upper part and a lower part, the lower part carrying the sieving gauze of the sifter.

Many sifters of this kind are already known. In general, the lower part 50 of the known sifters has an internal peripheral groove or recess 51 in which the sieving gauze 52 is received. The gauze 52 carries a reed member 53 at its periphery, and the upper part 54 caps the abovedescribed assembly (FIG. 1).

In accordance with known processes, the reed is injection moulded onto the edge of the sieving gauze. Now, in many cases, this process gives a generally unsatisfactory result as the synthetic material escapes through the gaps between the sieving gauze and the mould, so that a certain part of the sifter is blocked by the synthetic material. This gives rise to the necessity for additional work in order to remove the synthetic material from the sieving gauze.

In some cases, this is difficult, if not impossible. This therefore results in a substantial wastage of synthetic material and also of the products which must be scrapped.

The object of the present invention is to provide a sifter which is of a simple construction, avoiding time losses and production rejects.

For this purpose, the present invention concerns a sifter of the above type, characterised in that the upper and lower parts are engaged one into the other, the lower part integrally carrying the sifter gauze and the upper part being engaged into the lower part while bearing on the sifter gauze for tightening same.

By virtue of this construction, the sifter ensures that the sieving gauze is excellently well held in place, while ensuring that a part of the sieving gauze is not blocked by the synthetic material used in production of the sifter.

In accordance with another feature of the invention, the lower part is in one piece, being formed by a central portion having a U-shaped section which receives the edge of the sieving gauze, said central portion being terminated by two cylindrical or conical parts.

This embodiment is particularly simple as it is sufficient to clip or click the lower part onto the edge of the sieving gauze and to stick or weld the two ends of the central U-shaped portion, to secure the gauze. The lower part is then welded or fixed onto the upper part, which gives an undismantlable assembly.

In accordance with another feature of the invention, the lower part is in two parts, of substantially symmetrical ring-shaped section, which are fixed on respective sides of the edge of the sieving gauze, said two parts themselves being joined together.

This embodiment simplifies production and in particular making the lower part. In some cases, the two halves of the lower part can be precisely identical so that a single mould is then sufficient.

Finally, the invention also concerns a sifter formed by conventional upper and lower parts, the sieving gauze having around it a reed in two parts, which are joined together by heat-welding or adhesive. In this manner, it is also possible to avoid all the difficulties involved in the conventional methods of manufacturing sifters, as the reed which is made beforehand, for example of synthetic material, is simply fixed to the sieving gauze by joining together the two parts which form the reed.

In accordance with another feature of the invention, it is also possible to cast the lower part on the gauze, provided however that the gauze is crushed at the level of the mould to prevent synthetic material from dropping.

The present invention will be described in greater detail with reference to the accompanying drawings, in which the various figures are only half views in axial section of sifters which generally are bodies of revolution.

Figure 1:
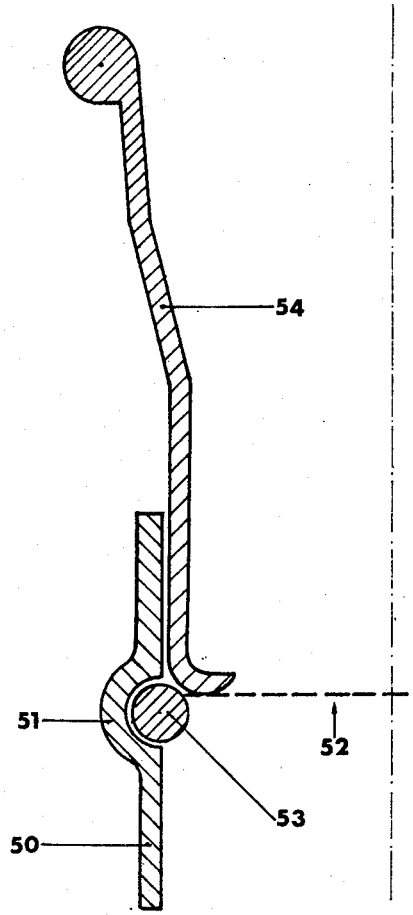
FIG. 1 is a diagrammatic view in cross-section of a sifter of the prior art.
Figure 2:
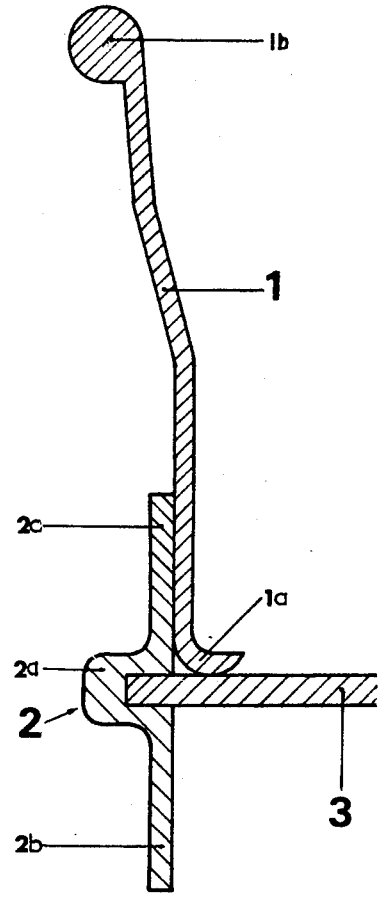
FIG. 2 is a view in axial cross-section of a sifter according to the invention.
Figure 3:
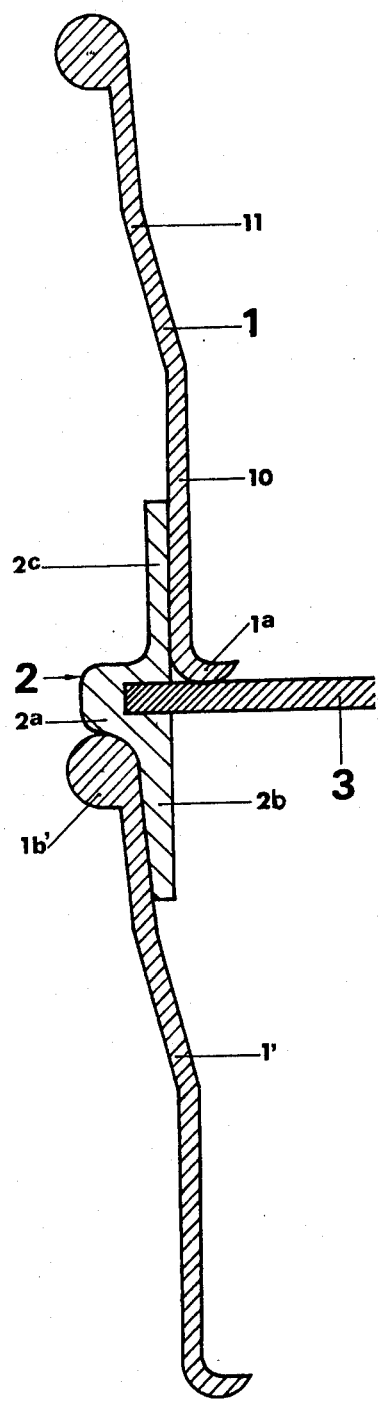
FIG. 3 is a view in cross-section showing the stacking of two sifters as shown in FIG. 2.

As shown in FIGS. 2 and 3, the sifter according to the invention comprises an upper part 1 and a lower part 2. The upper part is in the form of a cylinder which at its lower edge is terminated by an inwardly curved portion 1a and at its upper edge by a ring or collar 1b. The ring-shaped lower part 2 is in the form of a member of revolution whose central portion 2a is in the form of a U-shape, the end portions 2b and 2c being cylindrical or slightly conical. The portion 2a is fixed to the gauze 3, for example the metal gauze of the sifter. The central portion 2a is fixed to the gauze 3 for example by ultrasonic welding or by adhesive.

The upper part 1 engages into the conical portion 2c of the lower part 2 and the lower edge 1a comes to bear against the gauze 3 so as to hold the gauze 3 in a taut condition.

FIG. 3 shows the manner of stacking a sifter as shown in FIG. 2 onto a sifter of the same type of which only the upper part 1' is shown.

In greater detail, FIG. 3 also shows an alternative form of the upper parts 1, 1' which comprise a lower cylindrical portion 10 provided with an inwardly curved edge 1a and connected to an upper frustoconical portion 11. In this embodiment the lower part 2 is also of an asymmetric form, the upper portion 2c being virtually cylindrical while the lower portion 2b is of a pronounced frustoconical configuration, the edge portion 1b' of the upper part 1' coming to bear against the central portion 2a.

Figure 4:
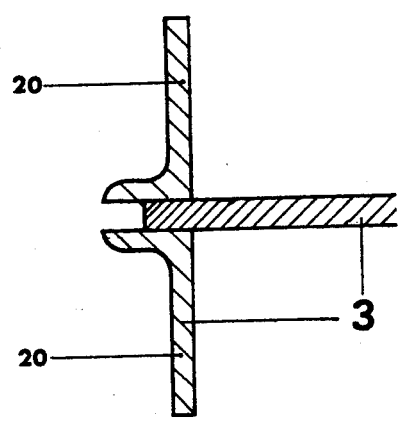
FIG. 4 shows an alternative embodiment of the construction shown in FIGS. 2 and 3.

In the alternative form shown in FIG. 4, the gauze 3 is fixed between two rings 20 which substantially correspond respectively to the halves of the ring 2 shown in FIGS. 2 or 3. The two parts 20 of the ring are welded or stuck to each other after insertion of the gauze 3. In order to facilitate insertion of the gauze 3 when the gauze 3 is of considerable thickness, the surfaces of the rings 20 which are in contact with the gauze 3 can be slightly reduced (not shown in the drawings).

Figure 5:
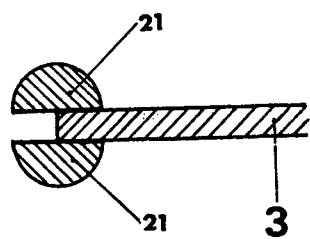
FIG. 5 shows another alternative embodiment of the construction shown in FIGS. 2 and 3.

In FIG. 5, the gauze 3 is fixed between two rings 21 and 21 each having a semi-circular cross-section.

In a particular embodiment, the upper part 1 can be welded to the cylindrical or conical portion 2c of the lower part 2 by sticking or ultrasonic welding, after the gauze 3 has been put under tension by the lower edge of the upper part 1. This prevents the sifter from becoming disassembled or the gauze 3 from losing its tension.

In an embodiment, the various parts of the sifter, with the possible exception of the gauze 3, are of synthetic material, which facilitates in particular sticking or ultrasonic welding.

In the embodiment of FIGS. 2 and 4, the lower part 2, 20 can be made by moulding it directly onto the metal gauze 3 after however the edge of the gauze 3 has been flattened before the gauze has been at least partially introduced into the mould; this is to ensure that when injection occurs the synthetic material cannot escape into the interstices which are left free between the gauze and mould.

The gauze 3 forming the sifter is a gauze of any desired dimensions such as of brass, stainless steel, galvanised wire,, iron, leather, silk or plastics material, and the like.

Obviously the invention is not limited to the above-described and illustrated embodiments, on the basis of which other embodiments and constructions can be envisaged without thereby departing from the scope of the invention.

I claim:

1. A sifter comprising:
    a discrete generally cylindrical shaped upper portion having an edge extending radially inward from the lower end of said upper portion;
    a discrete generally ring shaped lower portion having a central section and an upper section;
    a sifting screen fixedly secured to the central section of said lower portion;
    means for fixedly securing said sifting screen to said central section;
    means for holding said sifting screen in a tensioned state including the outer circumferential surface of the lower end of said upper portion engaging the inner surface of the upper section of said lower portion and the bottom surface of said inwardly extending edge bearing against said sifting screen;
    said securing means and the part of said lower portion immediately below said sifting screen each having an inner surface that extends radially inwardly no farther than said inner surface of the upper section whereby said inwardly extending edge holds said sifting screen in a tensioned state.

2. A sifter in accordance with claim 1 wherein said inwardly extending edge is comprised of a flange having a curved bottom surface for pressing downwardly on said sifting screen to hold said sifting screen in a tensioned state.

3. A sifter in accordance with claim 1 wherein a groove is formed in the central section of said lower portion, the edge of the sifting screen is fixed to a ring, and the ring is secured in said groove.

4. A sifter in accordance with claim 1 wherein said sifting screen is fixedly secured within a groove in the inner surface of the central section of said lower portion and a U-shaped ring extends generally outward of said central section beyond the outer surface of said upper section.

5. A sifter in accordance with claim 1 wherein said upper portion includes a frustoconical top part extending radially outward from the lower part of said upper portion.

6. A sifter in accordance with claim 1 wherein said lower portion includes a lower section extending generally downwardly from said central section.

7. A sifter in accordance with claim 6 including a second generally cylindrical shaped upper portion having a frustoconical top part extending radially outward from the lower part of said second upper portion, a second generally ring shaped lower portion, and a second sifting screen fixedly secured to the second lower portion, the lower section of said first lower portion fitting within the frustoconical top part of said second upper portion.

8. A sifter in accordance with claim 1 wherein said central station is formed by two generally symmetrical halves, said sifting screen being fixedly secured between said two halves.

9. A sifter in accordance with claim 1 wherein said upper portion is fixedly secured to said lower portion.

10. A sifter comprising:
    an upper portion having a frustoconical shaped top part and a generally cylindrical shaped bottom part;
    a flange extending radially inward from the lower end of said bottom part and having a curved bottom surface;
    a lower portion having a generally cylindrical upper section, a ring shaped central section, and a generally frustoconical lower section;
    said upper portion being fixedly secured to said lower portion;
    the cross-sectional thickness of said central section being greater than the cross-sectional thickness of said upper and lower sections;
    a groove formed in the inner surface of said central section;
    a sifting screen secured in the groove of said central section;
    means for fixedly securing said sifting screen in said groove;
    means for holding said sifting screen in a tensioned state including fitting the bottom part of said upper portion within the upper section of said lower portion and pressing the curved bottom surface of said flange against said sifting screen to thereby hold the sifting screen in a tensioned state; and
    said securing means and the part of said lower section immediately below said sifting screen each having an inner surface that extends radially inwardly no further than the inner surface of said upper member.

* * * * *